(12) United States Patent
Bernhardt et al.

(10) Patent No.: US 7,609,869 B2
(45) Date of Patent: Oct. 27, 2009

(54) PROCESSING METHOD FOR A TWO-DIMENSIONAL INITIAL IMAGE AND OBJECTS CORRESPONDING THERETO

(75) Inventors: Philipp Bernhardt, Forchheim (DE); Markus Lendl, Ottensoos (DE)

(73) Assignee: Siemens Aktiengesellschaft, Munich (DE)

( * ) Notice: Subject to any disclaimer, the term of this patent is extended or adjusted under 35 U.S.C. 154(b) by 674 days.

(21) Appl. No.: 11/472,844

(22) Filed: Jun. 22, 2006

(65) Prior Publication Data

US 2006/0291613 A1 Dec. 28, 2006

(30) Foreign Application Priority Data

Jun. 22, 2005 (DE) .................. 10 2005 028 892

(51) Int. Cl.
 *G06K 9/00* (2006.01)
(52) U.S. Cl. .................. 382/128; 382/131; 382/274; 382/276
(58) Field of Classification Search .................. 382/128, 382/131, 274, 276; 378/4
 See application file for complete search history.

(56) References Cited

U.S. PATENT DOCUMENTS 5,488,374 A 1/1996 Frankot et al.
7,155,044 B2* 12/2006 Vuylsteke .................. 382/128
7,266,229 B2* 9/2007 Couwenhoven et al. ..... 382/132
2003/0086105 A1 5/2003 Jostschulte

FOREIGN PATENT DOCUMENTS

| DE | 101 46 582 A1 | 4/2003 |
| EP | 0 527 525 A2 | 2/1993 |
| EP | 0 971 316 A2 | 1/2000 |

\* cited by examiner

*Primary Examiner*—Tom Y Lu

(57) ABSTRACT

A computer dismantles a two-dimensional initial image into partial images containing components that vary locally with partial image frequencies and a residual image containing a direct component which is locally invariable. For each partial image and residual image the computer determines a weighting factor and sums the weighted images into a final image. Based on a comparison of the partial image frequencies with a target frequency, the computer determines a partial image as a pilot image and its frequency as a pilot frequency. The computer determines weighting factors of the partial images so that partial images whose frequencies are below the pilot frequency are weighted less than the pilot image, and partial images whose frequencies are above the pilot frequency makes a large contribution when the noise component in the initial image is small and a small contribution when the noise component in the initial image is large.

19 Claims, 5 Drawing Sheets

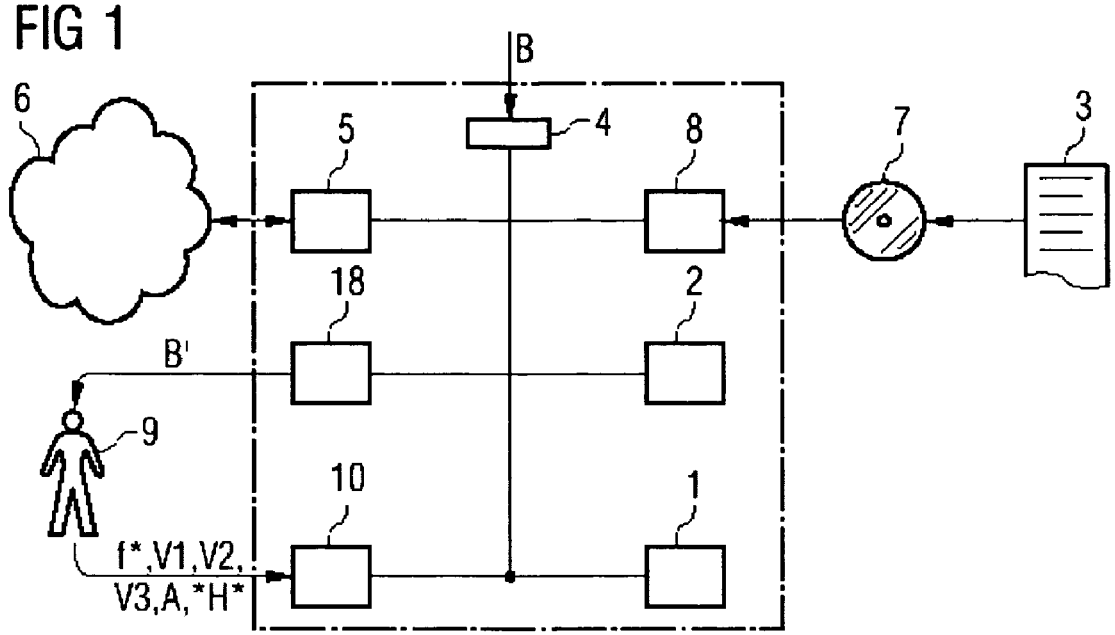
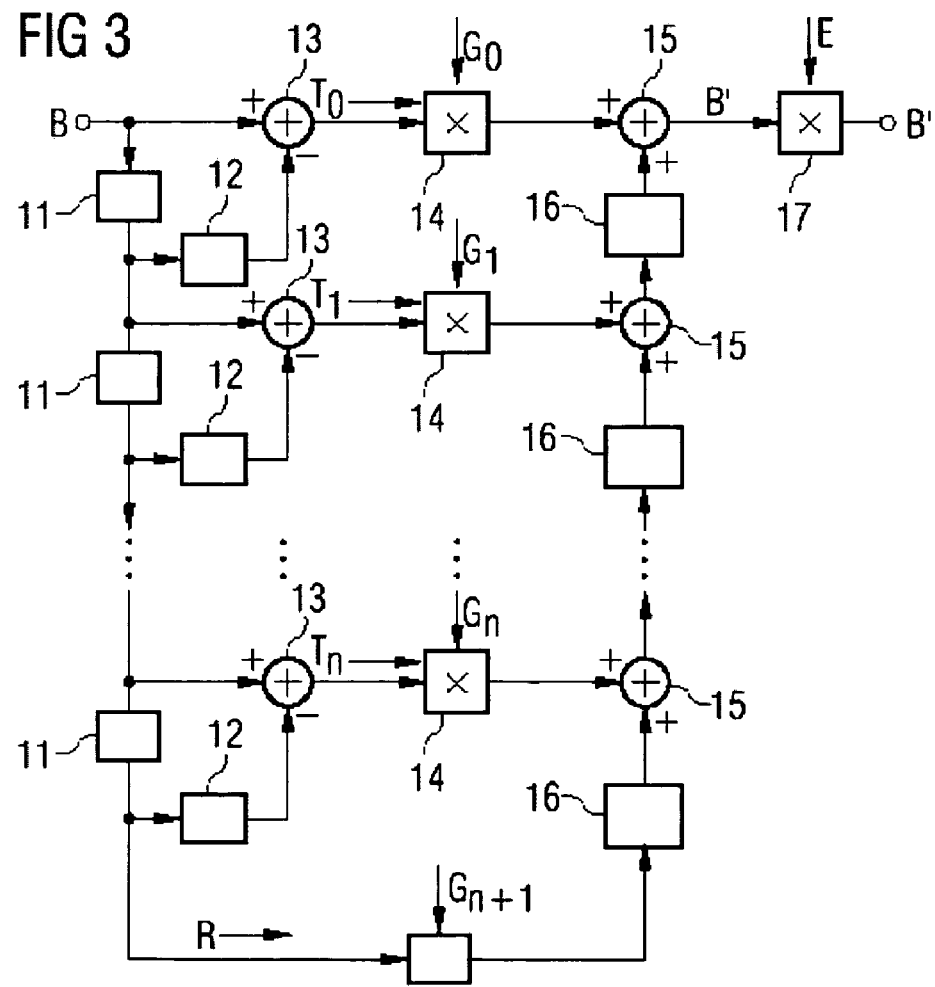

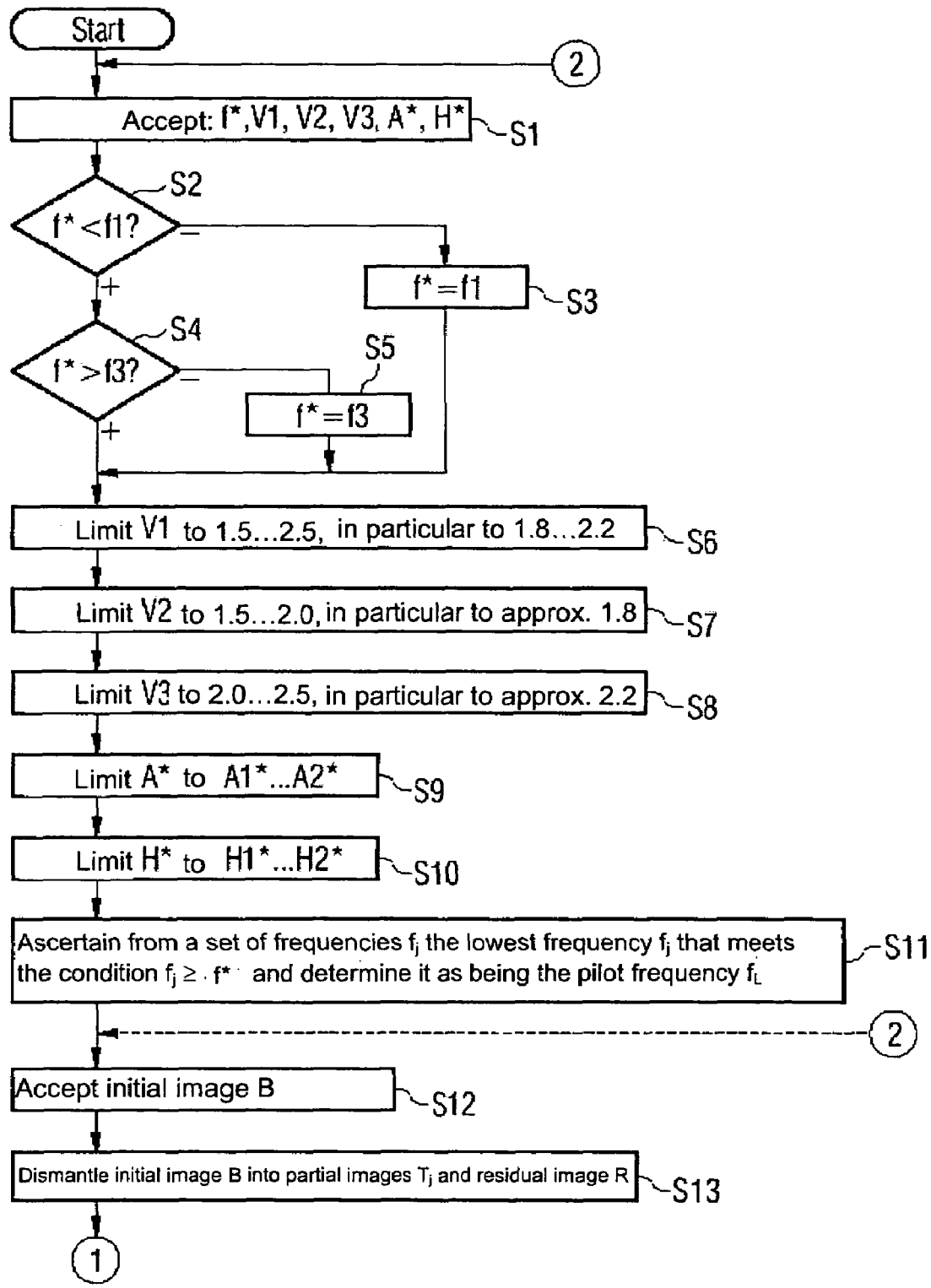

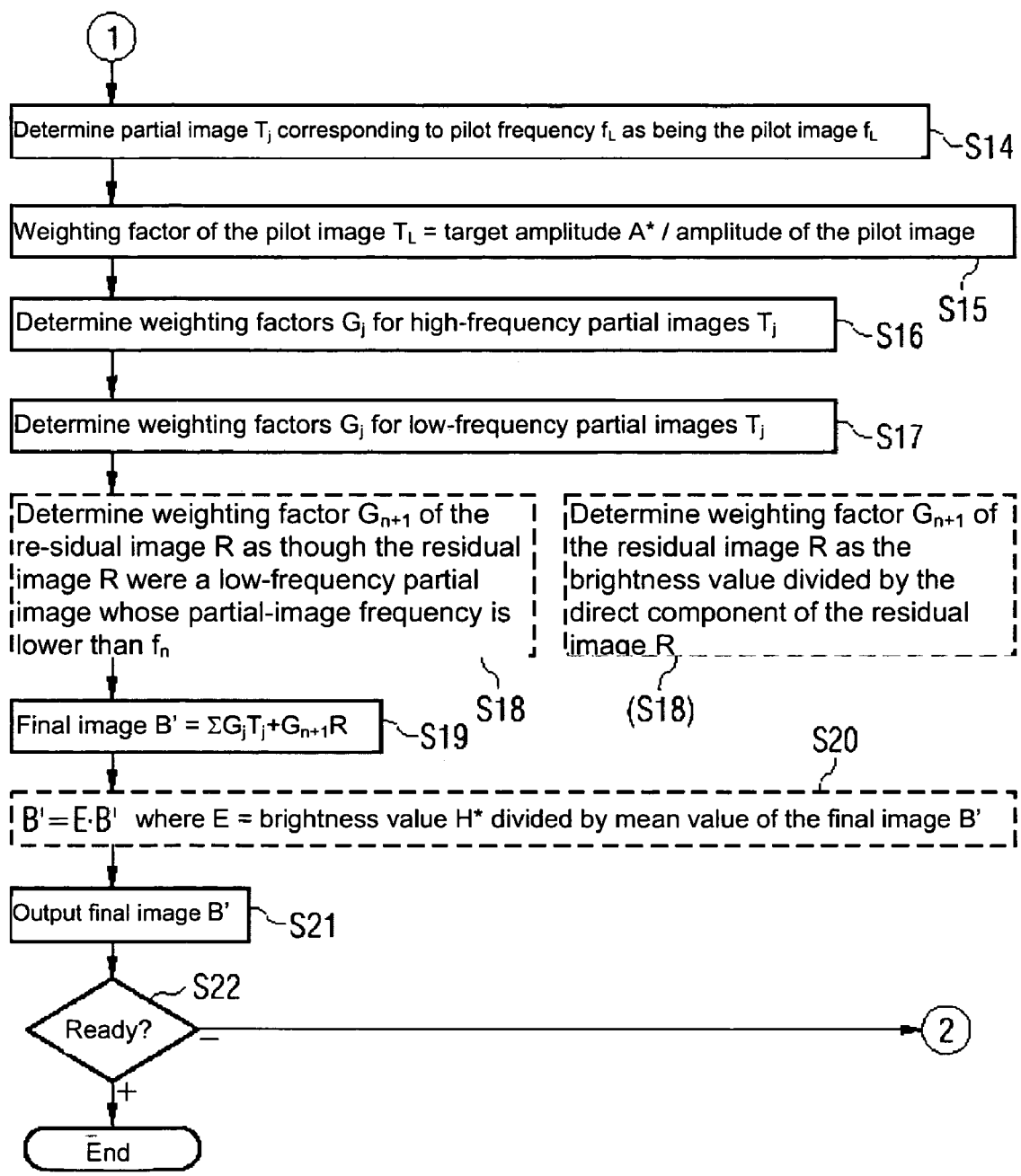

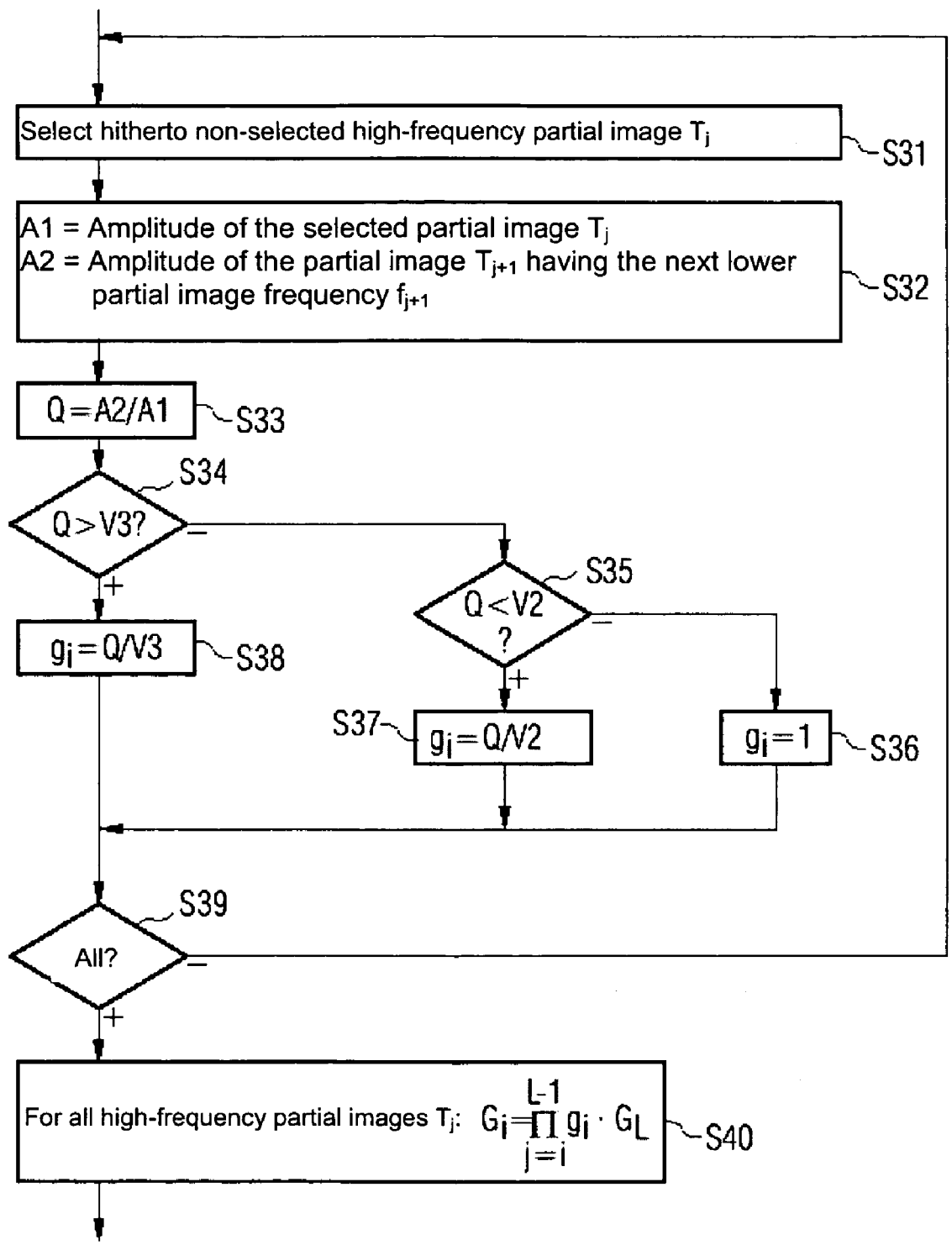

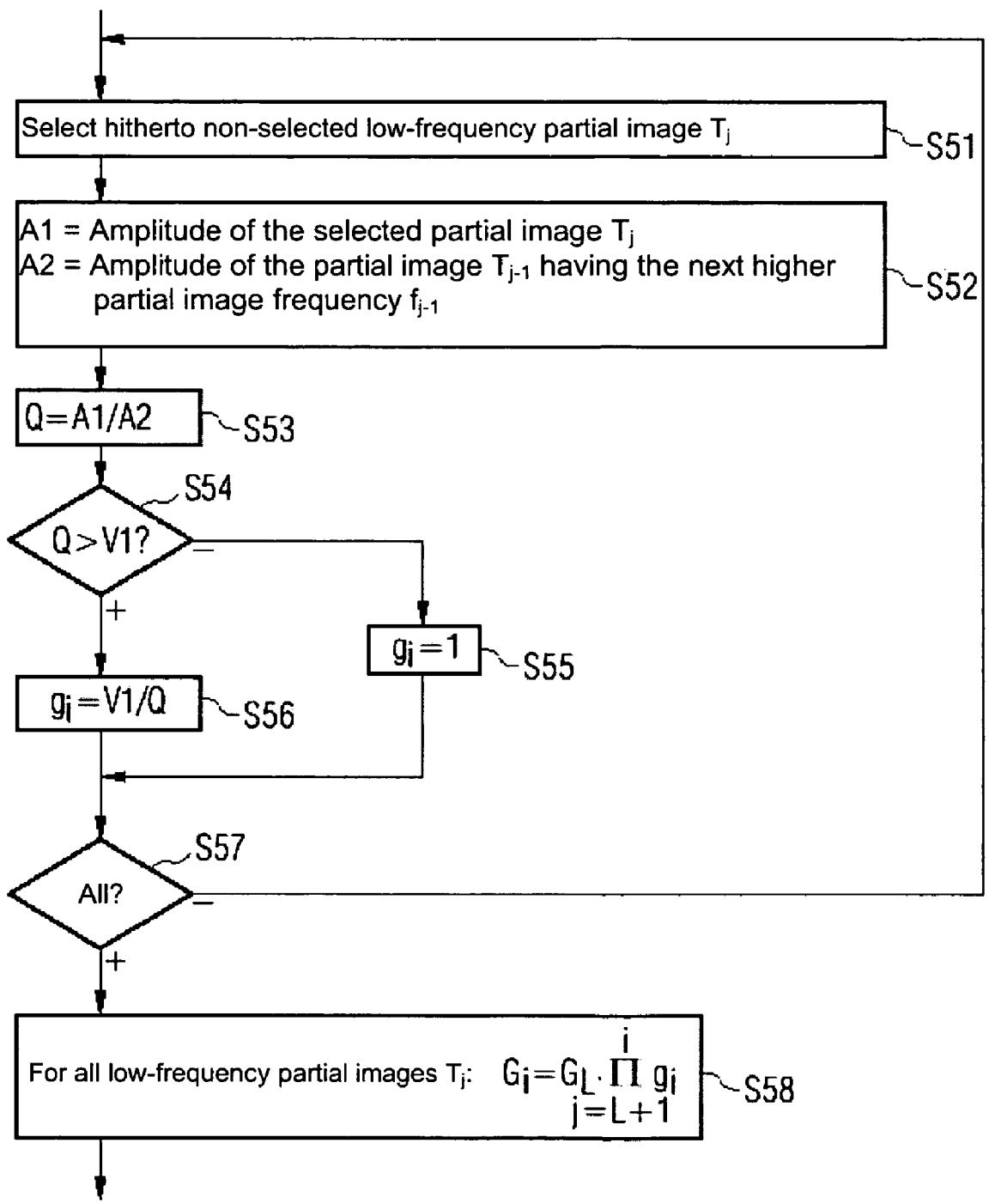

PROCESSING METHOD FOR A TWO-DIMENSIONAL INITIAL IMAGE AND OBJECTS CORRESPONDING THERETO

CROSS REFERENCE TO RELATED APPLICATIONS

This application claims priority of German application No. 10 2005 028 892.8 filed Jun. 22, 2005, which is incorporated by reference herein in its entirety.

FIELD OF THE INVENTION

The present invention relates to a processing method for a two-dimensional initial image. It further relates to a data medium having a computer program stored thereon for implementing a processing method of said type. It finally also relates to a computer having a data medium of said type.

BACKGROUND OF THE INVENTION

Initial images in terms of the present invention often have contents of medical import and are used in particular for diagnosing and in part also for purposes related to therapeutic treatment or, as the case may be, intervention. They are as a rule highly dynamic. The images in many cases furthermore contain fine details that include relevant image information, for example small vessels that are filled with a contrast medium, or guide wires. In many cases, such as while an intervention is in progress, the doctor providing the treatment is, however, unable or not well able to set imaging parameters and image editing parameters in such a way that the image will be edited well. The image presented should, though, also show all relevant details straight away, foremost in scene imaging, which is to say when there is a sequence of initial images.

In order to avoid excessive dynamism in the images presented, harmonizing is often carried out in the prior art using a predefined fixed filter core substantially corresponding to a high-pass filter. A major disadvantage of high-pass filters of said type is, however, the formation of black compression at edges, which can in extreme cases even lead doctors to make an incorrect diagnosis, but which as a rule at least result in an unfamiliar impression of an image.

The image's noise impression is also of significance for the observer. This applies foremost to X-ray-based imaging. That is because it will be very difficult to choose the correct contrast if the useful signal and noise cannot be separated from each other. If the contrast is too high, the observer's eye will be excessively irritated by the noise; if the contrast is too low, the signal will be almost or even completely undetectable.

It is known in the prior art how to proceed as follows for image editing:

A computer dismantles the initial image into partial images and a residual image.

Each partial image contains those components of the two-dimensional initial image that vary locally with a predetermined partial image frequency characteristic of the respective partial image and departing from zero.

The residual image contains at least one direct component of the two-dimensional initial image which component is locally invariable.

For each of the partial images and the residual image the computer determines a separate weighting factor with which it weights the respective partial image or, as the case may be, residual image, and sums the weighted partial images and weighted residual image into a final image.

With this procedure it will, however, only be possible to produce a good final image if the weighting factors of the partial images and residual image have been suitably determined. Specifying suitable criteria for determining the weighting factors is the subject of the present invention.

SUMMARY OF THE INVENTION

According to the present invention, based on a comparison of the partial image frequencies with a target frequency the computer first determines one of the partial images as being a pilot image and its partial image frequency as being a pilot frequency. The computer then determines the weighting factors of the partial images. Determining takes place therein such that partial images whose partial image frequency is below the pilot frequency (low-frequency partial images) will be weighted more weakly than the pilot image, but they will contribute to the final image. Partial images whose partial image frequency is above the pilot frequency (high-frequency partial images) will make a large contribution to the final image when the noise component in the initial image is small and a small contribution to the final image when the noise component in the initial image is large.

That is because on the one hand the relevant image information (which is to say the pilot image) will be weighted most strongly through this procedure, while on the other hand the fine structures contained in the initial image will also be emphasized if, and only if, the initial image is relatively low in noise.

The computer preferably determines the weighting factors of the low-frequency partial images in such a way that the low-frequency partial images will be weighted the more weakly the more their respective partial image frequency departs from the pilot frequency. Graduated weighting of said type can be achieved by, for example, the computer's determining the weighting factors of the low-frequency partial images in such a way that in each case the quotient of the amplitudes of two weighted partial images whose partial image frequencies are directly adjacent is limited to a first ratio.

Determining of the weighting factors of the low-frequency partial images will be especially simple and effective if the computer first determines an individual weighting factor for each low-frequency partial image in such a way that the quotient of the amplitude of the respective partial image weighted with the individual weighting factor and that of the amplitude of the non-weighted partial image having the next higher partial image frequency is limited to the first ratio, and for each low-frequency partial image thereupon determines its weighting factor by multiplying the individual weighting factor of the respective partial image with the weighting factor of the pilot image as well as with the individual weighting factors of all low-frequency partial images whose partial image frequency is higher than the partial image frequency of the respective partial image.

Determining of the individual weighting factors of the low-frequency partial images will be especially efficient if the computer first forms the quotient of the amplitude of the respective non-weighted partial image and that of the amplitude of the non-weighted partial image having the next higher partial image frequency, sets the individual weighting factor to the value 1 if the last-cited quotient does not exceed the first ratio, and otherwise determines the individual weighting factor in such a way that the quotient of the amplitude of the respective partial image weighted with the individual weighting factor and that of the amplitude of the non-weighted partial image having the next higher partial image frequency is the same as the first ratio.

The computer can have been permanently assigned the first ratio. It is, however, preferably assigned to the computer by an operator. Irrespective of how said ratio is assigned, it should, though, referred to a frequency ratio of 1:2, be between 1.5 and 2.2, preferably between 1.8 and 2.2.

If the computer determines the weighting factors of the high-frequency partial images in such a way that in each case the quotient of the amplitudes of two weighted partial images whose partial image frequencies are directly adjacent is between a second and third ratio, then determining of the weighting factors of the high-frequency partial images will be especially simple. To determine the weighting factors of the high-frequency partial images it is, for example, possible for the computer first to determine an individual weighting factor for each high-frequency partial image in such a way that the quotient of the amplitude of the non-weighted partial image having the next lower partial image frequency and that of the amplitude of the respective partial image weighted with the individual weighting factor is between the second and third ratio, and for each high-frequency partial image thereupon determines its weighting factor by multiplying the individual weighting factor of the respective partial image with the weighting factor of the pilot image as well as with the individual weighting factors of all high-frequency partial images whose partial image frequency is lower than the partial image frequency of the respective partial image.

Determining of the individual weighting factors of the high-frequency partial images will be especially efficient if the computer first forms the quotient of the amplitude of the non-weighted partial image having the next lower partial image frequency and that of the amplitude of the respective non-weighted partial image, sets the individual weighting factor to the value 1 if the last-cited quotient is between the second and third ratio, and otherwise determines the individual weighting factor in such a way that the quotient of the amplitude of the non-weighted partial image having the next lower partial image frequency and that of the amplitude of the respective partial image weighted with the individual weighting factor is the same as the second ratio or, as the case may be, is the same as the third ratio.

Analogously to the first ratio the computer can have been permanently assigned the second ratio and third ratio. They are, however, preferably assigned to the computer by an operator. Irrespective of how said ratios are assigned, the second ratio should, though, referred to a frequency ratio of 1:2, be between 1.5 and 2.0 and the third ratio between 2.0 and 2.5.

The computer preferably determines the weighting factor for the pilot image in such a way that the amplitude of the weighted pilot image is the same as a target amplitude, with said target amplitude preferably being assigned to the computer by an operator. It should, though, in this case too be between a minimum target amplitude and a maximum target amplitude.

The residual image can exclusively contain the direct component. In addition to the direct component it can, though, also contain those components of the two-dimensional initial image that vary locally with frequencies that are lower than the lowest partial image frequency (particularly low-frequency components).

Irrespective of whether the residual image exclusively contains the direct component or, in addition thereto, also the particularly low-frequency components of the two-dimensional initial image, the computer can determine the weighting factor of the residual image as though the residual image were a low-frequency partial image whose partial image frequency is lower than all other partial image frequencies.

The final image should preferably be of average brightness. The computer can for said purpose determine an end factor in such a way that a mean value of the final image multiplied by the end factor equals the brightness value. This procedure can always be applied. It can thus be applied in particular regardless of whether or not the residual image exclusively contains the direct component contains.

If, conversely, the residual image exclusively contains the direct component, then the computer can alternatively determine the weighting factor of the residual image in such a way that the direct component weighted with the weighting factor of the residual image equals the brightness value. A combination of said two procedures is theoretically also possible, although a combination of said type is in practice not expedient.

The computer can also have been permanently assigned the brightness value. It is, however, preferably assigned to the computer by an operator. It should, though, in this case too be between a minimum brightness value and a maximum brightness value.

The computer can furthermore also have been permanently assigned the target frequency. It should, though, preferably be able to be assigned by an operator. It should preferably be between an eighth and half the highest partial frequency.

BRIEF DESCRIPTION OF THE DRAWINGS

Further advantages and specifics will emerge from the following description of an exemplary embodiment in conjunction with the drawings.

FIG. 1 shows a basic structure of a computer,
FIG. 2 is a flowchart,
FIG. 3 is a block diagram,
FIG. 4 is a flowchart, and
FIG. 5 is another flowchart.

DETAILED DESCRIPTION OF THE INVENTION

According to FIG. 1 a computer has, inter alia, a central unit 1 and a bulk storage 2. The bulk storage 2 can be embodied as, for example, a hard disk. Stored in the bulk storage 2 is a computer program 3 on whose being called up the computer executes a processing method for a two-dimensional initial image B that is routed to the computer via a suitable interface 4.

The computer program 3 can have been routed to the computer via, for example, an interface 5 to a computer network 6. The computer network 6 can therein be, in particular, the internet or World Wide Web. The computer program 3 can, however, also be routed to the computer via a data medium 7 embodied as an exchangeable medium. The computer program 3, for example, is stored on a data medium 7 of said type exclusively in machine-readable form. It is inserted into a suitable read device 8 of the computer. The computer then reads the computer program 3 from the data medium 7 by means of the read device 8 and stores it in the bulk storage 2. If the data medium 7 is embodied as a CD ROM, the read device 8 can be embodied as, for example, a CD ROM drive or DVD drive.

When the computer program 3 is called up, the computer reads it from the bulk storage 2 and launches it. Executing the computer program 3, the computer then executes the processing method for the initial image B. Said processing method is explained in more detail below in conjunction with FIG. 2.

According to FIG. 2, in a step 1 the computer first accepts initial parameters f*, V1, V2, V3, A*, H*. The meaning of these is as follows:

f* stands for a target frequency f*,
V1, V2, and V3 are first to third ratios,
A* is a target amplitude, and
H* is a brightness value.

The initial parameters f*, V1, V2, V3, A*, H* can be assigned to the computer by an operator 9 via a suitable input device 10 (a keyboard or mouse, for example) each time the computer program 3 is called up. It is also possible for the operator 9 to change the initial parameters f*, V1, V2, V3, A*, H* interactively, which is to say at any time. It is, though, also possible for the computer to call up the last set initial parameters f*, V1, V2, V3, A*, H* from the bulk storage 2 and use them if the operator 9 does not assign new initial parameters f*, V1, V2, V3, A*, H*.

The computer checks in steps S2 to S5 whether the target frequency f* is between frequencies $f_1$ and $f_3$. Where applicable, the computer will limit the target frequency f* accordingly. The meaning of the frequencies $f_1$ and $f_3$ will become apparent later.

The computer checks analogously in steps S6 to S10 whether the ratios V1, V2, V3, the target amplitude A*, and the brightness value H* are also within prespecified value ranges. Where applicable the computer will limit the ratios V1, V2, V3, the target amplitude A*, and the brightness H* accordingly. The procedure is therein totally analogous to the steps S2 to S5 so that steps S6 to S10 do not have to be presented in detail.

Next, in a step S11 the computer determines a pilot frequency $f_L$. Said pilot frequency $f_L$ is therein the lowest in a set of frequencies $f_i$ (i=0, ..., n) that meets the condition $f_i \geq f^*$, which is to say is higher than or equal to the target frequency f*. The set of frequencies $f_i$ also contains, inter alia, the frequencies $f_1$ and $f_3$ mentioned above in connection with steps S2 to S5.

In a step S12 the computer accepts the initial image B via the interface 4. Said initial image B is routed to the computer for example directly and online from an X-ray device. For the sake of a clearer presentation said X-ray device is not, though, shown in FIG. 1.

In a step S13 the computer dismantles the initial image B into partial images $T_i$ (i=0, ..., n) and a residual image R. Said dismantling can take place in any way. For example a Fourier transformation can be performed and the Fourier coefficients examined or individually transformed back. Dismantling can, though, alternatively also be carried out by means of, for example, a Gaussian pyramid. According to the exemplary embodiment (see FIG. 3) the initial image B is dismantled into the partial images $T_i$ and the residual image R in a Laplace pyramid by means of a number of reduction blocks 11 and expansion blocks 12 as well as summation points 13.

The structure and operation of the Laplace pyramid is generally familiar to persons skilled in the art: The reduction blocks 11 perform low-pass filtering and undersampling by the factor 2 in both dimensions of the image respectively routed to them. The expansion blocks 12 that follow perform corresponding expansion and interpolation with the factor 2, preferably likewise in both dimensions.

The result thus contains the partial image $T_0$ of those components of the initial image B that vary locally with a period of two pixels. Said partial image $T_0$ thus contains those components of the two-dimensional initial image B that vary locally with the highest partial image frequency $f_0$ characteristic of the partial image $T_0$. The partial image $T_1$ contains those components of the initial image B that vary locally with a local period of four pixels. Said partial image $T_1$ thus contains those components of the two-dimensional initial image B that vary locally with the corresponding second highest partial image frequency $f_1$. Said partial image frequency $f_1$ is therein half the partial image frequency $f_0$. Analogous embodiments apply to the other partial images $T_i$. What applies to the corresponding partial image frequencies $f_i$ is that directly sequential partial image frequencies $f_i$, $f_{i+1}$ have a ratio of 2:1.

The residual image R contains at least one direct component of the two-dimensional initial image B. It thus contains the component of the two-dimensional initial image B that does not vary locally. The residual image R will even exclusively contain the direct component if the Laplace pyramid is high enough. If, conversely, the Laplace pyramid is not high enough, the residual image R will in addition to the direct component also contain those components of the two-dimensional initial image B that vary locally with frequencies that are lower than the partial image frequency $f_n$. Said partial image frequency $f_n$ is therein the lowest of all partial image frequencies $f_i$.

In a step S14 the computer then determines the specific image from among the partial images $T_i$ that corresponds to the pilot frequency $f_L$, for the pilot image $T_L$. If, for example, the partial image frequency $f_2$ was determined in step S11 for the pilot frequency $f_L$, the partial image $T_2$ will be determined in step S13 for the pilot image $T_L$. This case will be assumed below as being illustrative. It is, though, as already mentioned, purely illustrative.

For the sake of brevity, partial images $T_i$ whose partial image frequency $f_i$ is below the pilot frequency $f_L$, hence, according to the example given, partial images $T_3$, $T_4$ etc., will be referred to in the following as low-frequency partial images $T_i$. The partial images $T_i$ whose partial image frequency $f_i$ is above the pilot frequency $f_L$, hence in the present case the partial images $T_0$ and $T_1$, will in like manner be referred to in the following as high-frequency partial images $T_i$.

In steps S15 to S18 the computer thereupon determines weighting factors $G_i$ (i=0, ..., n, n+1) for the partial images $T_i$ and the residual image R. It thus determines a separate weighting factor $G_i$ for each of the partial images $T_i$ and also for the residual image R. In a step S19 (see FIG. 3 again for amplification) the computer then weights each of the partial images $T_i$ and also the residual image R in weighting blocks 14 with its corresponding weighting factor $G_i$ and forms the sum of the weighted partial images $T_i$ and of the weighted residual image R by means of summation points 15. Said sum is referred to below as the final image B'. If necessary, the partial images $T_i$ and the residual image R will therein be expanded in expansion blocks 16 and interpolated in keeping with FIG. 3.

The weighting factor $G_L$ of the pilot image $T_L$, in this case, therefore, the weighting factor $G_2$, is determined in step S15 using the amplitude of the pilot image $T_L$ and the target amplitude A*. That is because the weighting factor $G_L$ is simply set as equaling the quotient of target amplitude A* and amplitude of the pilot image $T_2$. The weighting factor $G_L$ of the pilot image $T_L$ is therefore determined in such a way that the amplitude of the weighted pilot image $T_L$ equals the target amplitude A*.

Determining of the weighting factors $G_i$ for the high-frequency partial images $T_i$, in this case, therefore, the weighting factors $G_0$ and $G_1$ for the partial images $T_0$ and $T_1$, will be explained in more detail below in conjunction with FIG. 4. Determining of the weighting factors $G_i$ for the low-frequency partial images $T_i$, in this case, therefore, the weighting factors $G_3$, $G_4$ etc. for the partial images $T_3$, $T_4$ etc., will be explained in more detail below in conjunction with FIG. 5.

It is possible as part of step S18 to treat the residual image R as though it were a low-frequency partial image whose partial image frequency is lower than all other partial image frequencies $f_i$, hence in particular lower than the lowest partial image frequency $f_n$. This is mandatory, even, if the residual image R contains not only the direct component but also locally variable components of the initial image B. If implemented in this way, step S18 is therefore not necessarily implemented as an independent step but can instead be integrated in step S17. It has therefore only been drawn in dashed manner in FIG. 2.

If, conversely, the residual image R exclusively contains the direct component, then another, alternative procedure is possible. That is because in this case it is also possible for the computer to determine the weighting factor $G_{n+1}$ of the residual image R in such a way that the direct component weighted with the weighting factor $G_{n+1}$ of the residual image R equals the brightness value H*. It is for said purpose only necessary for the weighting factor $G_{n+1}$ of the residual image R to be set as equaling the quotient of the brightness value H* and of the direct component of the residual image R. This possible procedure is indicated in FIG. 2 by a said type of alternative implementation of step S18 being drawn likewise in dashed manner alongside step S18.

Alternatively to the last mentioned implementation of step S18 it is possible, in a step S20, to determine a mean value of the final image B', and to set an end factor E equaling the quotient of the brightness value H* and of the mean value of the final image B', and to multiply the final image B' with said end factor E for example in a multiplier block 17. Scaling of the mean value of the final image B' to the brightness value H* is also achieved thereby.

The procedure according to step S20 will always be expedient if the residual image R is treated like a low-frequency partial image. Whether, however, the residual image R only contains the direct component or locally variable components as well is, on the other hand, insignificant. Step S20 will, though, be omitted if scaling of the direct component already takes place in step S18. Step S20 has therefore also only been drawn in dashed manner in FIG. 2.

If the residual image R exclusively contains the direct component, the difference between the brightness setting according to the alternative embodiment of step S18 and the brightness setting according to step S20 is that the last-cited procedure will also co-influence the partial images $T_i$ though not the brightness setting according to step S18.

In a step S21 the final image B' is finally fed out by the computer to the operator 9 via a suitable output device 18, for example a monitor 18. A concluding check is performed by the computer in a step S22 to determine whether another initial image B is to be processed. If so, a return is made to step S1 or, alternatively, step S12. The difference between returning to step S1 and returning to step S12 is that the initial parameters f*, V1, V2, V3, A*, H* could also be reset in the case of a return to step S1, while in the case of a return to step S12 they can only be set when the computer program 3 is called up.

The procedure according to FIG. 4 is preferably as follows for determining the weighting factors $G_i$ of the high-frequency partial images $T_i$:

In a step S31 the computer first selects a high-frequency partial image $T_i$ not selected by it before. In a step S32 it determines the amplitude A1 of said high-frequency partial image $T_i$ and the amplitude A2 of the partial image $T_{i+1}$ having the next lower partial image frequency $f_{i+1}$. Said last-cited partial image $T_{i+1}$ is as a rule also a high-frequency partial image $T_i$. It could, though, also be the pilot image $T_L$ (hence in this case the partial image $T_2$). In a step S33 the computer then forms the quotient Q of the two above-cited amplitudes A1, A2.

The computer checks in steps S34 and S35 whether the quotient Q is within a ratio range limited by the second ratio V2 and third ratio V3. If so, in a step S36 the computer sets an individual weighting factor $g_i$ for the high-frequency partial image $T_i$ selected in step S31 to the value 1. Otherwise in step S37 or, as the case may be, S38 the computer will set the individual weighting factor $g_i$ of the high-frequency partial image $T_i$ selected in step S31 to the value Q/V2 or, as the case may be, Q/V3.

What is thus achieved by means of steps S37 and S38 is that the quotient Q of the amplitude of the non-weighted partial image $T_{1+1}$ having the next lower partial image frequency $f_{i+1}$ and that of the amplitude of the respective partial image $T_i$ weighted with the individual weighting factor $g_i$ is equal to the second ratio V2 or, as the case may be, third ratio V3. What, though, is in any event achieved, hence also when step S36 is executed, is that the computer first determines the individual weighting factor $g_i$ for the high-frequency partial image $T_i$ selected in step S31 in such a way that the quotient Q of the amplitude of the non-weighted partial image $T_{i+1}$ having the next lower partial image frequency $f_{i+1}$ on the one hand and, on the other, that of the amplitude of the high-frequency partial image $T_i$ weighted with the individual weighting factor $g_i$ will be between the second and third ratio V2, V3.

The computer then checks in a step S39 whether it has already determined the individual weighting factor $g_i$ for all high-frequency partial images $T_i$. If not, the computer will return to step S31, where it will select another high-frequency partial image $T_i$. The computer will otherwise execute a step S40 in which it will determine the weighting factor $G_i$ for each high-frequency partial image $T_i$ by multiplying the individual weighting factor $g_i$ of the respective partial image $T_i$ with the weighting factor $G_L$ of the pilot image $T_L$ (thus in the present case with the weighting factor $G_2$) as well as with the individual weighting factors $g_j$ of all high-frequency partial images $T_j$ whose partial image frequency $f_j$ is lower than the partial image frequency $f_i$ of the respective partial image $T_i$.

What is thus achieved by means of the—purely illustrative—procedure shown in FIG. 4 is that the computer will determine the weighting factors $G_i$ of the high-frequency partial images $T_i$ in such a way that in each case the quotient of the amplitudes of two weighted partial images $T_i$, $T_{i+1}$ whose partial image frequencies $f_i$, $f_{i+1}$ are directly adjacent will be between the second and third ratio V2, V3.

The quotient Q of the amplitudes of two high-frequency partial images $T_i$ that are directly adjacent in terms of their partial image frequencies $f_i$ is the smaller the noisier the initial image B is. If the initial image B is very noisy, meaning it has a large noise component, then owing to steps S37 and S40, in particular to step S37, the high-frequency partial images $T_i$ will thus provide a minor contribution to the final image B'. If, conversely, the initial image B is only slightly noisy, meaning it has a small noise component, then owing to steps S38 and S40, in particular to step S38, the high-frequency partial images $T_i$ will by contrast provide a major contribution to the final image B'.

Determining of the weighting factors $G_i$ for the high-frequency partial images $T_i$ according to FIG. 4 is purely illustrative. If information about the noise component in the initial image B is available from elsewhere (based, for instance, on knowledge of the set parameters of the X-ray source or of parameters of the X-ray detector or based on an averaging performed across a multiplicity of initial images B), then the individual weighting factors $g_i$ and also the weighting factors $G_i$ of the high-frequency partial images $T_i$ can also be determined differently. Steps S32 to S38 in particular could in such a case also be implemented differently.

The procedure according to FIG. 5 is preferably as follows for determining the weighting factors $G_i$ of the low-frequency partial images $T_i$ (including, where applicable, the residual image R):

In a step S51 the computer first selects a low-frequency partial image $T_i$ not selected by it before. In a step S52 it determines the amplitude A1 of the selected low-frequency partial image $T_i$ and the amplitude A2 of the partial image $T_{i+1}$ having the next higher partial image frequency $f_{i-1}$. Said last-cited partial image $T_{i-1}$ is as a rule also a low-frequency partial image $T_{i-1}$. It could, though, also be the pilot image $T_L$. In a step S53 the computer thereupon forms the quotient Q of the above-cited amplitudes A1, A2.

The computer checks in a step S54 whether the quotient Q exceeds the first ratio V1. If not, in a step S55 the computer sets an individual weighting factor $g_i$ for the low-frequency partial image $T_i$ selected in step S51 to the value 1. Otherwise in a step S56 the computer will set the individual weighting factor $g_i$ for the partial image $T_i$ selected in step S51 as equaling the quotient of the first ratio V1 and previously determined quotient Q. This case, which is to say the execution of step S56, is the standard case. Step S55 will only be executed in exceptional cases. The individual weighting factors $g_i$ of the low-frequency partial images $T_i$ are thus as a rule less than one.

What is achieved by means S56 is that the quotient of the amplitude of the respective low-frequency partial image $T_i$ weighted with the individual weighting factor $g_i$ and that of the amplitude of the non-weighted partial image $T_{i-1}$ having the next higher partial image frequency $f_{i-1}$ is equal to the first ratio V1. What, though, will be achieved irrespective of whether step S56 or (in exceptional cases) step S55 is executed is that the computer will determine the individual weighting factor $g_i$ for each low-frequency partial image $T_i$ in such a way that the quotient of the amplitude of the respective partial image $T_i$ weighted with the individual weighting factor $g_i$ and that of the amplitude of the non-weighted partial image $T_{i-1}$ having the next higher partial image frequency $f_{i-1}$ will be limited to the first ratio V1.

The computer checks in a step S57 whether it has already determined the individual weighting factors $g_i$ for all low-frequency partial images $T_i$ (including, where applicable, the residual image R). If not, the computer will return to step S51, where it will select another, hitherto non-selected low-frequency partial image $T_i$. The computer will otherwise execute a step S58 in which it will determine the weighting factor $G_i$ for each low-frequency partial image $T_i$ by multiplying the individual weighting factor $g_i$ of the respective partial image $T_i$ with the weighting factor $G_L$ of the pilot image $T_L$ (thus in the present case with the weighting factor $G_2$) as well as with the individual weighting factors $g_j$ of all low-frequency partial images $T_j$ whose partial image frequency $f_j$ is higher than the partial image frequency $f_i$ of the respective partial image $T_i$.

What is thus achieved by means of the—likewise purely illustrative—procedure shown in FIG. 5 is that the computer will determine the weighting factors $G_i$ of the low-frequency partial images $T_i$ in such a way that in each case the quotient of the amplitudes of two weighted partial images $T_i$, $T_{i-1}$ whose partial image frequencies $f_i$, $f_{i-1}$ are directly adjacent will be limited to the first ratio V1. Since, moreover, as mentioned above, the individual weighting factors $g_i$ of the low-frequency partial images $T_i$ are as a rule less than one, the computer will determine the weighting factors $G_i$ of the low-frequency partial images $T_i$ in such a way that the low-frequency partial images $T_i$ will be weighted the more weakly the more their respective partial image frequency $f_i$ departs from the pilot frequency $f_L$. They will in particular thus be weighted more weakly than the pilot image $T_L$, but they will nonetheless contribute to the final image B'.

In particular the following advantages can be achieved by means of the inventive procedure:

The discernibility of the useful signal (meaning small objects as a rule) in the final image B' can be improved.

A constant image impression can be achieved in terms of contrast, brightness H*, and noise impression alongside relatively good decoupling of the recording parameters.

There is an optimal balance between contrast and noise in the different partial image frequencies $f_i$.

The natural noise impression is largely retained because no non-linear or directional filters have to be used.

No artificial structures in terms of swirls (Van Gogh effect) or linear splitters are to be expected.

A presentation of excessively bright and excessively dark image areas can be avoided.

A formation of black compression can in many cases be completely avoided. In cases where it cannot, it is greatly reduced compared to previous processing methods.

An emphasizing of high local frequencies $f_i$ and less high local frequencies $f_i$ is integrated in a uniform filter structure.

The filter can be used in a simple manner for signal scaling and/or as a preliminary filter for further image processing steps.

The invention claimed is:

1. A method for processing a two-dimensional initial image used in a medical procedure, comprising:
   dismantling the two-dimensional initial image into a plurality of partial images and a residual image by a computer,
      wherein each of the partial images contains a component of the two-dimensional initial image that varies locally with a predetermined partial image frequency departing from zero,
      wherein the residual image contains a direct component of the two-dimensional initial image that is locally invariable;
   assigning one of the partial images as a pilot image and assigning a frequency of the pilot image as a pilot frequency based on a comparison of frequencies of the partial images with a target frequency;

determining a plurality of weighting factors for the partial images and the residual image; and summing the weighted partial images and the weighted residual image into a final image, wherein the weighting factors of the partial images are determined by the computer so that:

the partial images with lower frequencies than the pilot frequency are weighted less than the pilot image but still contribute to the final image, the partial images with higher frequencies above the pilot make:

a large contribution to the final image when a noise component in the initial image is small, or a small contribution to the final image when the noise component in the initial image is large.

2. The method as claimed in claim 1, wherein a weighting factor of a selected low-frequency partial image is determined so that:

the selected low-frequency partial image is weighted decreasingly as a frequency of the selected low-frequency partial image departs further away from the pilot frequency, and a quotient of amplitudes of two weighted low-frequency partial images whose partial image frequencies are directly adjacent is limited to a first ratio.

3. The method as claimed in claim 2, wherein an individual weighting factor of the selected low-frequency partial image is determined so that a quotient of an amplitude of the selected low-frequency partial image weighted with the individual weighting factor and an amplitude of a non-weighted low-frequency partial image having a next higher partial image frequency is limited to the first ratio, and wherein the weighting factor of the selected low-frequency partial image is determined by multiplying the individual weighting factor of the selected low-frequency partial image with a weighting factor of the pilot image and with individual weighting factors of remaining low-frequency partial images whose partial image frequencies are higher than a frequency of the selected low-frequency partial image.

4. The method as claimed in claim 3, wherein a process for determining the individual weighting factor of the selected low-frequency partial image comprises:

forming a quotient of an amplitude of a non-weighted partial image of the selected low-frequency partial image and the amplitude of the non-weighted low-frequency partial image having the next higher partial image frequency, setting the individual weighting factor of the selected low-frequency partial image to:

a value of 1 if a last-cited quotient does not exceed the first ratio, or determine the individual weighting factor so that the quotient of the amplitude of the selected low-frequency partial image weighted with the individual weighting factor and the amplitude of the non-weighted low-frequency partial image having the next higher partial image frequency is identical with the first ratio if the last-cited quotient exceeds the first ratio.

5. The method as claimed in claim 2, wherein the first ratio is assigned to the computer by an operator and is between 1.5 and 2.5.

6. The method as claimed in claim 5, wherein the first ratio is between 1.8 and 2.2.

7. The method as claimed in claim 1, wherein a weighting factor of a selected high-frequency partial image is determined so that a quotient of amplitudes of two weighted high-frequency partial images whose partial image frequencies are directly adjacent is between a second and third ratio.

8. The method as claimed in claim 7, wherein an individual weighting factor of the selected high-frequency partial image is determined so that a quotient of an amplitude of a non-weighted high-frequency partial image having a next lower partial image frequency and an amplitude of the selected high-frequency partial image weighted with the individual weighting factor is between the second and third ratio, and wherein the weighting factor of the selected high-frequency partial image is determined by multiplying the individual weighting factor of the selected high-frequency partial image with a weighting factor of the pilot image and with individual weighting factors of remaining high-frequency partial images whose partial image frequencies are lower than a frequency of the selected high-frequency partial image.

9. The method as claimed in claim 8, wherein a process for determining the individual weighting factor of the selected high-frequency partial image comprises:

forming a quotient of the amplitude of the non-weighted high-frequency partial image having the next lower partial image frequency and an amplitude of a non-weighted partial image of the selected high-frequency partial image, setting the individual weighting factor of the selected high-frequency partial image to:

a value of 1 if a last-cited quotient is between the second and third ratio, or determine the individual weighting factor so that the quotient of the amplitude of the non-weighted high-frequency partial image having the next lower partial image frequency and the amplitude of the selected high-frequency partial image weighted with the individual weighting factor is identical with the second or the third ratio.

10. The method as claimed in claim 7, wherein the second and third ratio are assigned to the computer by an operator and the second ratio is between 1.5 and 2.0 and the third ratio is between 2.0 and 2.5.

11. The method as claimed in claim 1, wherein a weighting factor for the pilot image is determined so that an amplitude of a weighted pilot image is identical with a target amplitude.

12. The method as claimed in claim 11, wherein the target amplitude is assigned to the computer by an operator.

13. The method as claimed in claim 1, wherein the residual image contains:

exclusively the direct component of the two-dimensional initial image which is locally invariable, or components of the two-dimensional initial image that vary locally with frequencies that are lower than a lowest partial image frequency in addition to the direct component of the two-dimensional initial image.

14. The method as claimed in claim 13, wherein a weighting factor of the residual image is determined as though the residual image were a low-frequency partial image whose partial image frequency is lower than frequencies of the partial image.

15. The method as claimed in claim 13, wherein an end factor is determined so that a mean value of the final image multiplied by the end factor equals a brightness value which is assigned to the computer by an operator.

16. The method as claimed in claim 13, wherein a weighting factor of the residual image which contains exclusively the direct component of the two-dimensional initial image is determined so that the direct component weighted with the weighting factor of the residual image equals a brightness value which is assigned to the computer by an operator.

17. The method as claimed in claim 1, wherein the target frequency is assigned to the computer by an operator and is between an eighth and half of the highest partial image frequency.

18. A computer program stored on a computer readable medium for processing a two-dimensional initial image used in a medical procedure, comprising:
- a computer subroutine for disassembling the two-dimensional initial image into a plurality of partial images and a residual image by a computer,
    - wherein each of the partial images contains a component of the two-dimensional initial image that varies locally with a predetermined partial image frequency departing from zero,
    - wherein the residual image contains a direct component of the two-dimensional initial image that is locally invariable;
- a computer subroutine for assigning one of the partial images as a pilot image and assigning a frequency of the pilot image as a pilot frequency based on a comparison of frequencies of the partial images with a target frequency;
- a computer subroutine for determining a plurality of weighting factors for the partial images and the residual image; and
- a computer subroutine for summing the weighted partial images and the weighted residual image into a final image,
- wherein the computer determines the weighting factors of the partial images so that:
    - the partial images with lower frequencies than the pilot frequency are weighted less than the pilot image but still contribute to the final image,
    - the partial images with higher frequencies above the pilot frequency make:
        - a large contribution to the final image when a noise component in the initial image is small, or
        - a small contribution to the final image when the noise component in the initial image is large.

19. A computer for processing a two-dimensional initial image used in a medical procedure, comprising:
- a hard drive storing a computer program, the computer program comprises:
    - a computer subroutine for breaking down the two-dimensional initial image into a plurality of partial images and a residual image by the computer,
        - wherein each of the partial images contains a component of the two-dimensional initial image that vary locally with a predetermined partial image frequency departing from zero,
        - wherein the residual image contains a direct component of the two-dimensional initial image that is locally invariable;
    - a computer subroutine for assigning one of the partial images as a pilot image and assigning a frequency of the pilot image as a pilot frequency based on a comparison of frequencies of the partial images with a target frequency;
    - a computer subroutine for determining a plurality of weighting factors for the partial images and the residual image; and
    - a computer subroutine for summing the weighted partial images and the weighted residual image into a final image,
    - wherein the computer determines the weighting factors of the partial images so that:
        - the partial images with lower frequencies than the pilot frequency are weighted less than the pilot image but still contribute to the final image,
        - the partial images with higher frequencies above the pilot frequency make:
            - a large contribution to the final image when a noise component in the initial image is small, or
            - a small contribution to the final image when the noise component in the initial image is large.

* * * * *

UNITED STATES PATENT AND TRADEMARK OFFICE
CERTIFICATE OF CORRECTION

PATENT NO. : 7,609,869 B2  Page 1 of 1
APPLICATION NO. : 11/472844
DATED : October 27, 2009
INVENTOR(S) : Bernhardt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this

Fourteenth Day of December, 2010

David J. Kappos
*Director of the United States Patent and Trademark Office*